(12) United States Patent
Alcalan et al.

(10) Patent No.: US 11,155,355 B2
(45) Date of Patent: Oct. 26, 2021

(54) MOUNTING ASSEMBLY

(71) Applicant: Bell Helicopter Textron Inc., Fort Worth, TX (US)

(72) Inventors: Stephen P. Alcalan, Mansfield, TX (US); Aaron P. Simek, Keller, TX (US); Tyson T. Henry, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 843 days.

(21) Appl. No.: 15/802,983

(22) Filed: Nov. 3, 2017

(65) Prior Publication Data

US 2019/0135446 A1     May 9, 2019

(51) Int. Cl.
    *B64D 29/06*      (2006.01)
    *F16B 21/12*      (2006.01)
    *B64C 29/00*      (2006.01)

(52) U.S. Cl.
    CPC .............. *B64D 29/06* (2013.01); *F16B 21/12* (2013.01); *B64C 29/0033* (2013.01); *F16B 2200/506* (2018.08)

(58) Field of Classification Search
    CPC .... B64C 7/02; B64C 5/06; B64C 5/12; B64C 5/16; B64C 1/26; B64C 23/06; F16D 1/10; F16D 2001/103; Y10T 403/7026; Y10T 403/7033; Y10T 403/7035
See application file for complete search history.

(56) References Cited

U.S. PATENT DOCUMENTS

| | | | | |
|---|---|---|---|---|
| 2,974,965 A | * | 3/1961 | Welles, Jr. ............... | B23G 1/46 403/9 |
| 4,938,094 A | * | 7/1990 | Cochard ................... | F16D 1/12 403/374.4 |
| 5,002,422 A | * | 3/1991 | Schremmer ............. | F16D 1/104 403/359.5 |
| 5,366,316 A | * | 11/1994 | Cymbal ................ | F16D 1/0894 403/378 |
| 5,816,112 A | * | 10/1998 | Hosoi ...................... | B62D 1/10 74/552 |

FOREIGN PATENT DOCUMENTS

FR            953618 A   *   12/1949  ............... B64C 1/26

\* cited by examiner

*Primary Examiner* — Richard R. Green
(74) *Attorney, Agent, or Firm* — Timmer Law Group, PLLC

(57) ABSTRACT

A mounting assembly for coupling an accessory to a frame including a base configured to be coupled to the frame; the base having a hollow portion; the hollow portion including a receiving end including a tapered socket; an internal interlocking portion adjacent to the tapered socket; and a securing end opposite from the receiving end; a shaft configured to be connected to an accessory at a first end and received in the hollow portion of the base in an engaged position, the shaft including a tapered boss adjacent to the first end, the tapered boss configured to engage the tapered socket; an external interlocking portion adjacent to the tapered boss configured to engage the internal interlocking portion; and a second end opposite from the first end, the second end including a threaded surface; wherein when the shaft is in an engaged position, the shaft is static in the hollow portion.

6 Claims, 8 Drawing Sheets

MOUNTING ASSEMBLY

GOVERNMENT RIGHTS

This invention was made with government support under N00019-12-G-0006, DO 0089, awarded by NAVAIR. The government has certain rights in the invention.

BACKGROUND

Technical Field

The present disclosure relates to a mounting assembly for use on aircraft, and, in particular, to a mounting assembly attached to the airframe.

Description of Related Art

An example of an aircraft is a tiltrotor. A tiltrotor aircraft can include nacelle sails that can generate signification bending, torsional, and axial loading into the nacelle airframe structure. The nacelle sails can be installed and removed for maintenance purposes. Conventional mounting assemblies for nacelle sails use a close tolerance, minimal clearance slip fit between a straight, cylindrical shaft and a straight, cylindrical receiver, each having smooth mating surfaces. Manual sanding and smoothing of the shaft is needed to accomplish the close-tolerance, minimal clearance slip fit, which makes producibility difficult. As the nacelle sail is loaded during flight, the clearances start to increase and open up. The slip fit can react to bending loads, but does not address torsional loads. The conventional mounting assembly can include concentric holes drilled through the shaft and receiver and bolts secured therethrough to react to torsional loads during flight. As the nacelle sail is loaded and unloaded during flight, the bolts tend to fail due to fatigue after most flights. Accordingly, there is a need for an improved mounting assembly for a nacelle sail.

SUMMARY

In a first aspect, there is provided a mounting assembly for coupling an accessory to a frame including a base configured to be coupled to the frame; the base having a hollow portion; the hollow portion including a receiving end including a tapered socket; an internal interlocking portion adjacent to the tapered socket; and a securing end opposite from the receiving end; a shaft configured to be connected to an accessory at a first end, the shaft configured to be received in the hollow portion of the base in an engaged position, the shaft including a tapered boss adjacent to first end, the tapered boss configured to engage the tapered socket; an external interlocking portion adjacent to the tapered boss configured to engage the internal interlocking portion; and a second end opposite from the first end, the second end including a threaded surface; wherein when the shaft is in an engaged position, the shaft is static in the hollow portion of the base.

In an embodiment, the mounting assembly further includes a nut configured to be threaded onto the threaded surface of the shaft; wherein when the nut is tightened, the shaft is secured into an engaged position.

In another embodiment, the nut is a conically shaped nut, and the base further includes an angled portion at the securing end to receive the conically shaped nut.

In one embodiment, the shaft further includes a cylindrical portion disposed on the second end adjacent to the threaded surface.

In still another embodiment, the cylindrical portion is smooth.

In yet another embodiment, the mounting assembly includes a washer in contact with the nut and the base.

In an embodiment; compression of the washer is provided by the nut threadingly engaging with the threaded surface on the shaft.

In one embodiment, the washer includes a conically shaped washer.

In another embodiment, the base further includes an angled portion at the securing end to receive the conically shaped washer.

In an embodiment, the base and shaft are releasably coupled with a fastener member.

In one embodiment, the fastener member is a quick-release lock pin.

In yet another embodiment, a clocking feature disposed on at least one of the base and the shaft.

In an embodiment, the accessory is a nacelle sail.

In another embodiment, the frame is an airframe of an aircraft.

In a second aspect, there is provided a base for a mounting assembly that couples an accessory to a frame including a base configured to be coupled to the frame; the base having a hollow portion; the hollow portion including a receiving end including a tapered socket; an internal interlocking portion adjacent to the tapered socket; and a securing end opposite from the receiving end.

An embodiment provides that the base further includes an angled portion at the securing end.

In yet another embodiment, the base includes a clocking feature.

In a third aspect, there is provided a shaft for a mounting assembly that couples an accessory to a frame including a shaft configured to be connected to an accessory at a first end, the shaft configured to be received in the hollow portion of the base in an engaged position, the shaft including: a tapered boss adjacent to a first end, the tapered boss configured to engage the tapered socket; an external interlocking portion adjacent to the tapered boss configured to engage the internal interlocking portion; and a second end opposite from the first end, the second end including a threaded surface.

In another embodiment, the shaft includes a cylindrical portion disposed on the second end adjacent to the threaded surface.

In one embodiment, the cylindrical portion is smooth.

In yet another embodiment, the shaft includes a clocking feature.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the mounting assembly, systems, and methods are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
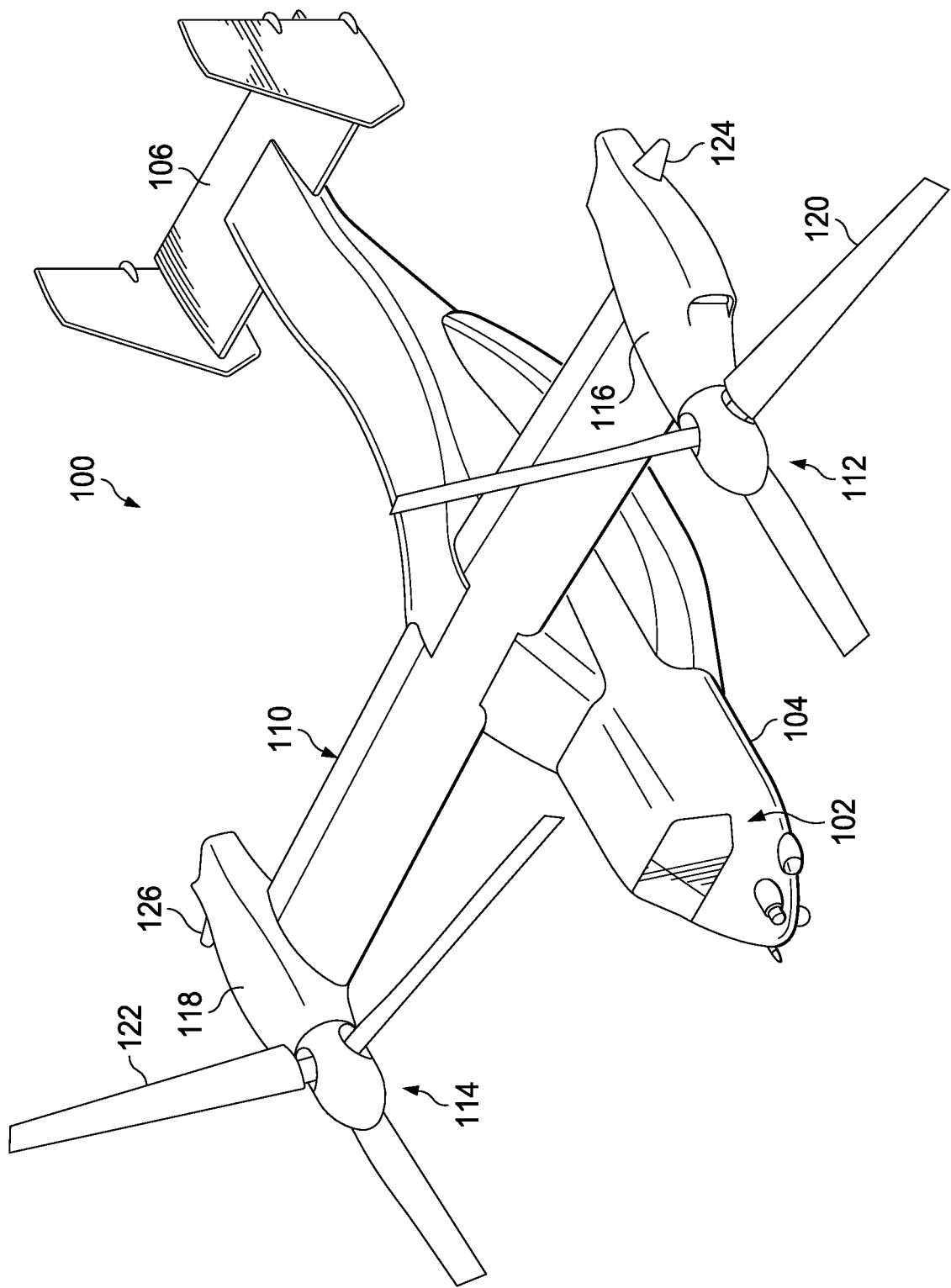
FIG. 1A is a perspective view of a tiltrotor aircraft with the rotor systems in airplane mode, according to an embodiment.
Figure 1B:
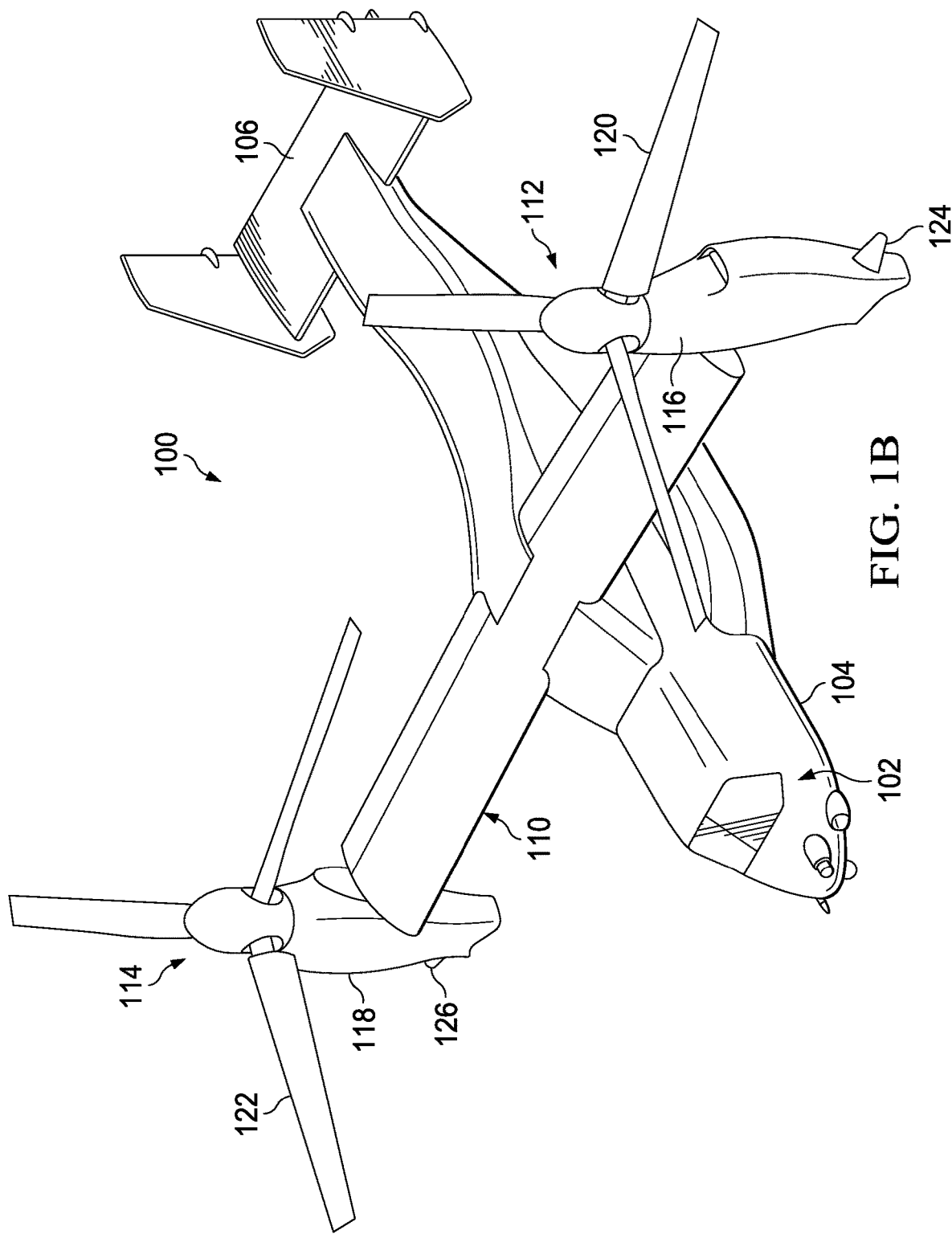
FIG. 1B is a perspective view of the tiltrotor aircraft with the rotor systems in helicopter mode, according to an embodiment.

Referring to FIGS. 1A-1B, an example tiltrotor aircraft 100 is illustrated. The tiltrotor aircraft 100 includes a fuselage 102, a wing 110, a first rotor system 112, and a second rotor system 114. The fuselage 102 includes a main body section 104 and a tail member 106.

The first and second rotor systems 112, 114 each includes a first and second rotatable nacelle 116, 118, respectively. Each nacelle 116, 118 is coupled to an end portion of the wing 110. Each nacelle 116, 118 houses a propulsion system that includes an engine, a gearbox, and a drive shaft supported within an airframe. A first and second plurality of rotor blades 120, 122 are operably associated with a drive shaft in each of the first and second nacelles 116, 118, respectively. Each first and second nacelle 116, 118 includes a nacelle sail 124, 126 disposed on the outboard side thereof.

Aircraft 100 is configured to fly in an airplane mode, in which the first and second rotor systems 112, 114 are positioned approximately horizontal. In addition, aircraft 100 is configured to fly in a helicopter mode, in which first and second rotor systems 112, 114 are positioned approximately vertical. It should be appreciated that rotor systems 112, 114 can be oriented at any positioned between vertical and horizontal, which can correspond with flying in a conversion mode.

Figure 2:
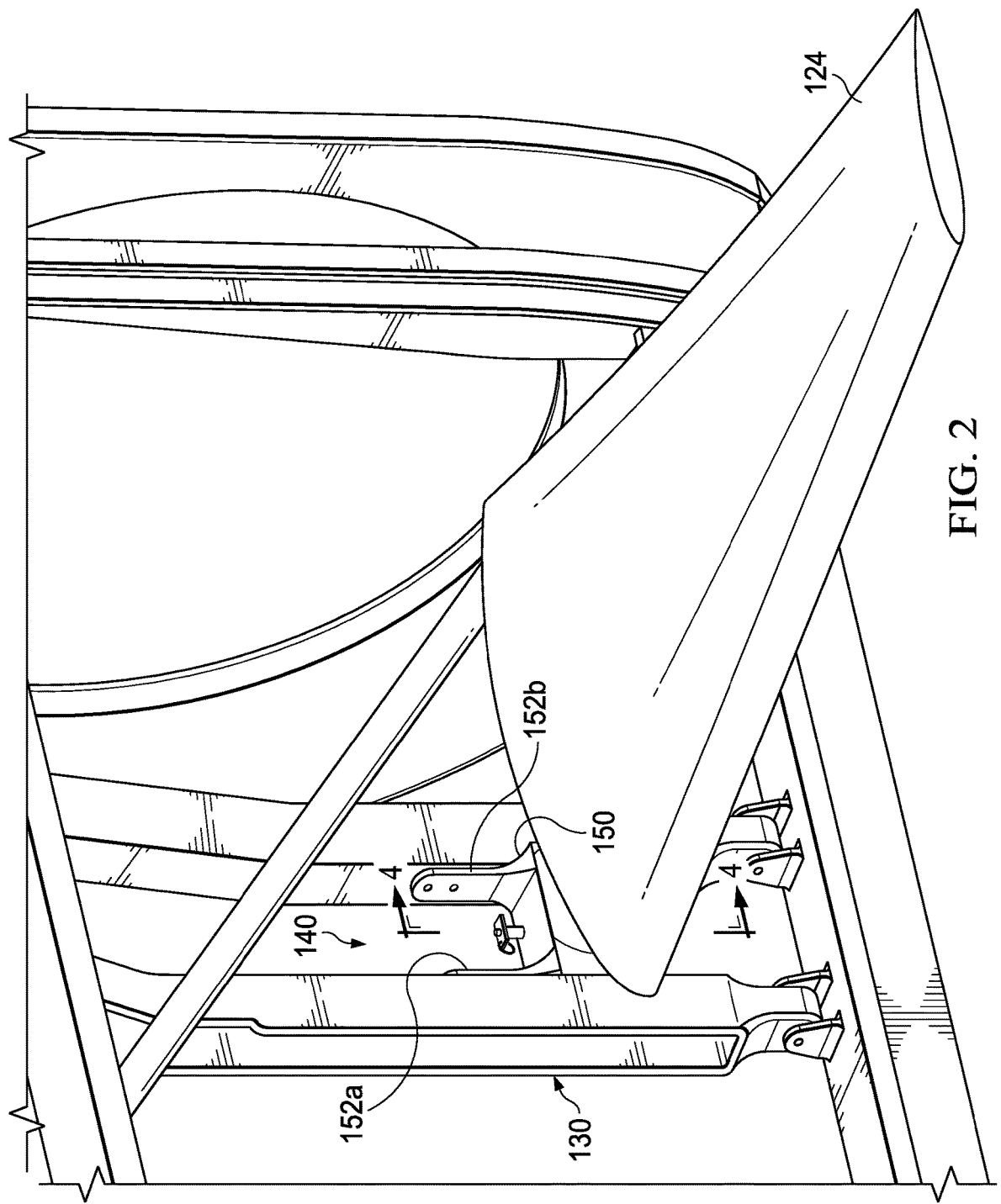
FIG. 2 is a perspective view of the nacelle sail and mounting assembly connected to the airframe of the nacelle 116 (skin removed), according to an embodiment.

Nacelle sail 124 is mounted to the airframe 130 of the first nacelle 116 by a mounting assembly 140, as shown in FIG. 2. The first rotor system 112 is a mirror image of the second rotor system 114, therefore, for the sake of efficiency only the mounting assembly 140 for the nacelle sail 124 to the first rotor system 112 will be disclosed. However, one of ordinary skill in the art would fully appreciate an understanding of the mounting assembly for the nacelle sail 126 to the second rotor system 114 based upon the disclosure herein.

Figure 6:
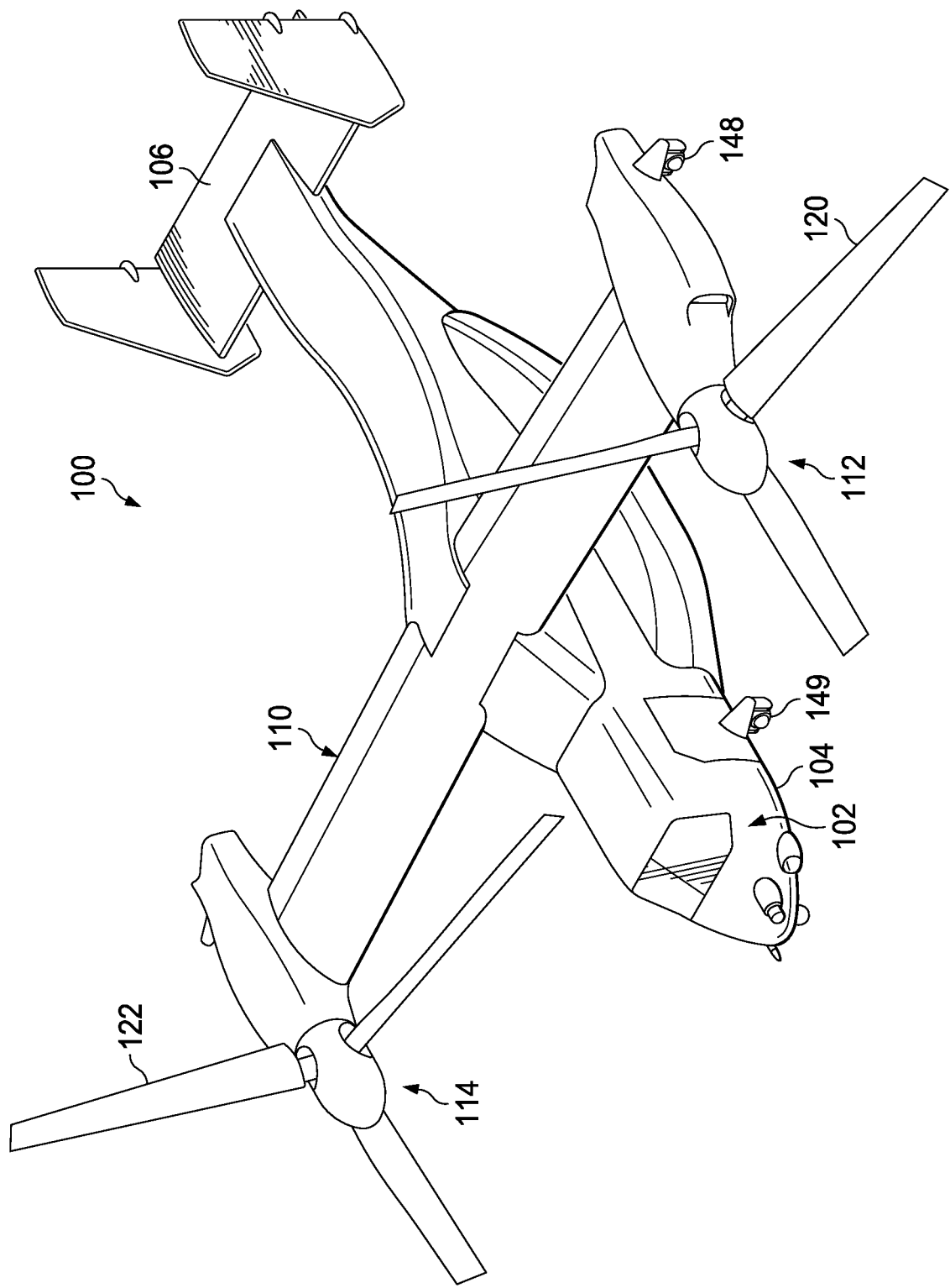
FIG. 6 is a perspective view of a tiltrotor aircraft with camera accessories, according to an exemplary embodiment.

FIGS. 1A-1B and 2 illustrate nacelle sail 124 attached to tiltrotor aircraft 100. It will be appreciated that nacelle sail 124 is but one example of an accessory that can be mounted to the airframe of aircraft 100 using the mounting assembly 140. In other embodiments, the accessory may be an any appropriate or desired type of device or apparatus, such as, but not limited to, a camera, a weapon, cargo, a hoist, a hook, an airfoil member, a light, landing gear, equipment, rescue equipment, a banner, and/or combinations thereof. FIG. 6 is an example of a first camera 148 mounted to the aircraft 100 using the mounting assembly 140 shown in FIGS. 2-4. A second camera 149 is mounted to the fuselage 102 using a second mounting assembly (not shown) connected to the fuselage airframe.

In addition, any mounting assembly, system, component, feature thereof, or method relating thereto depicted in FIGS. 1-7B and/or described herein can be used with aircraft, vehicles, and/or other devices that can benefit from the mounting assembly described herein. In some embodiments, the mounting assembly can be used with any aircraft having one or more rotor assemblies, including tiltrotor aircrafts, helicopters, tilt wing aircrafts, unmanned aerial vehicles (UAVs), hovercrafts, and other vertical lift or VTOL aircrafts, or can further be used with vehicles, equipment, devices, and other attachment objects having one or more accessories. Further, any features of one embodiment of the mounting assembly or components thereof in this disclosure can be used with any other embodiment in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Moreover, mounting assembly 140 can be configured to couple to an attachment object. In the example shown in FIGS. 1-7B, the attachment object is the airframe 130 of the aircraft 100. In other embodiments, the attachment object is the frame or other suitable attachment surface or structure for an aircraft, vehicle, equipment, and/or other device.

Figure 3:
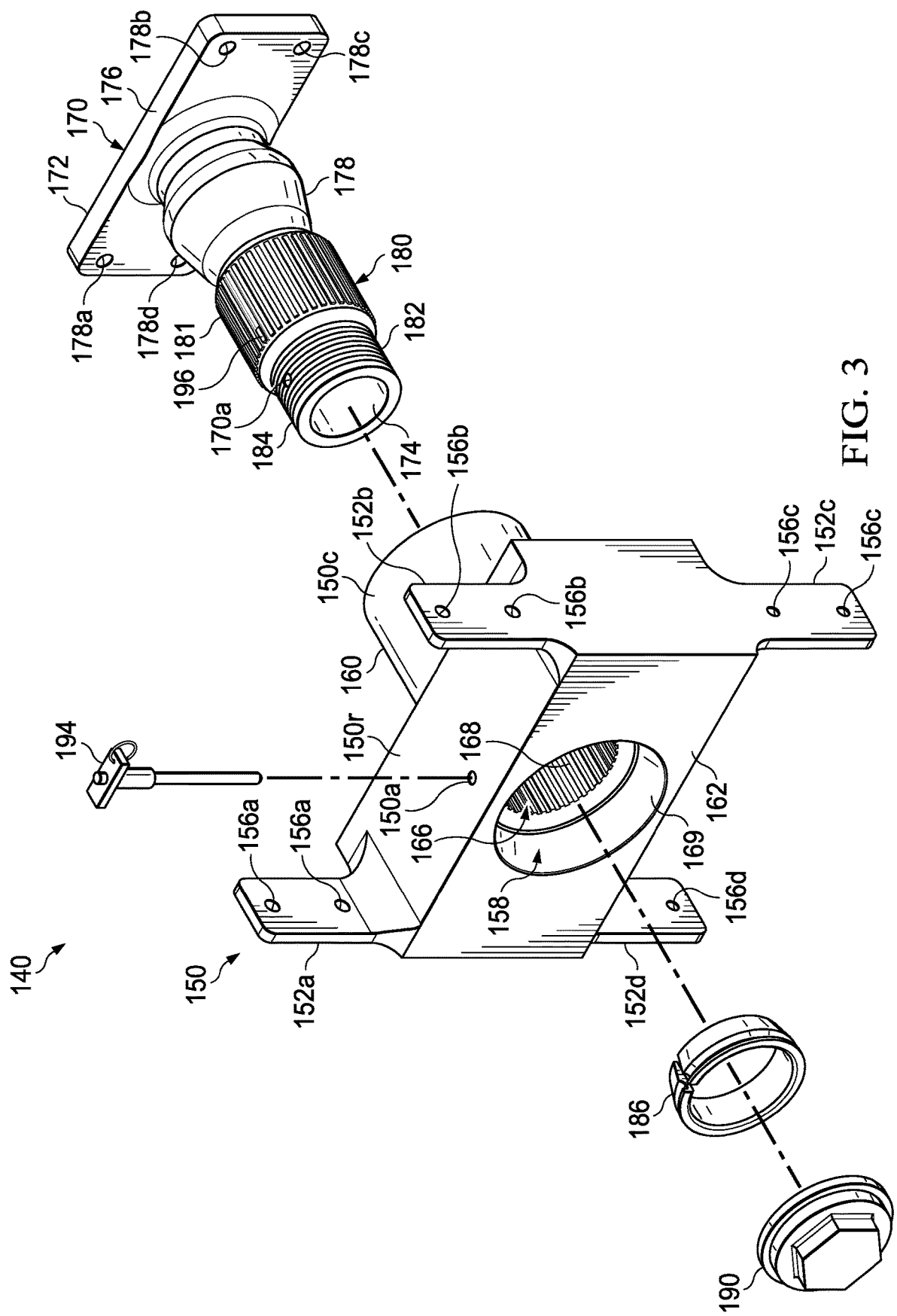
FIG. 3 is an exploded view of a mounting assembly, according to one exemplary embodiment.
Figure 4:
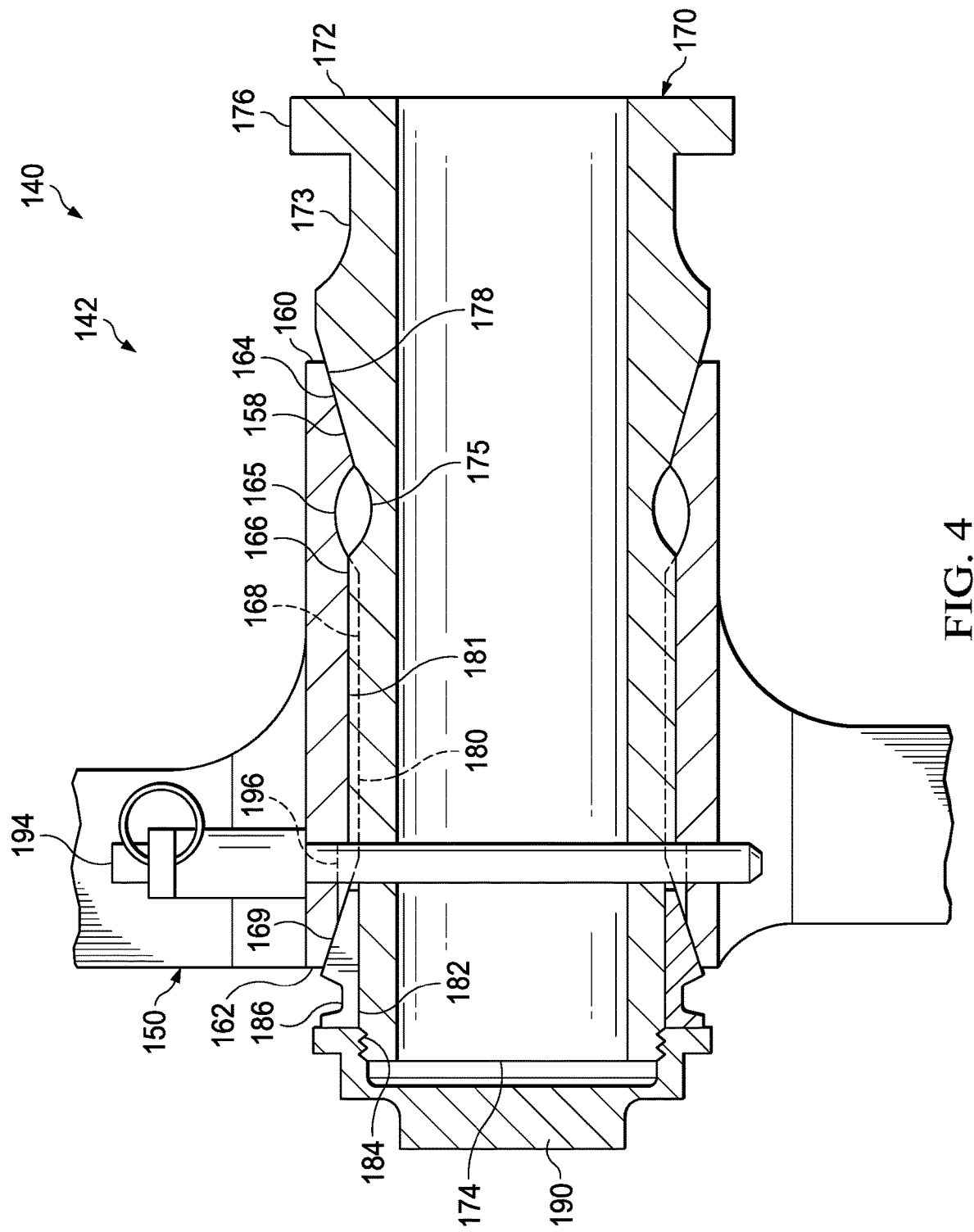
FIG. 4 is a cross-sectional view of the mounting assembly FIGS. 2-3 in an engaged position.

In an embodiment, shown in FIGS. 3-4, the mounting assembly 140 includes a base 150, a shaft 170, a washer 186, a nut 190, and a fastener member 194. The base 150 includes frame flanges 152a, 152b, 152c, and 152d for connecting to the airframe 130. Conventional fasteners positioned in a plurality of openings 156a, 156b, 156c, 156d and/or adhesive connect the base 150 to the airframe 130. In the embodiment shown, base 150 includes four frame flanges; and, in other embodiments, base 150 includes less or more frame flanges (e.g. one, two, three, five, six, seven or more frame flanges). The number and size of frame flanges 152a-152d can depend for on, for example, but not limitation, the size and weight of the accessory, torsional loads or other forces, and the attachment object (e.g., the rotorcraft frame).

The base 150 includes a hollow portion 158 configured to slidably receive and releasably connect with shaft 170. The hollow portion 158 includes a receiving end 160 disposed in a cylindrical region 150c of the base. The receiving end 160 is outboard of a securing end 162 disposed in a rectangular region 150r of the base 150. The hollow portion 158 is a longitudinally extending hole that extends completely through from the receiving end 160 to the securing end 162. The hollow portion 158 is an interior cavity that includes a tapered socket 164, an internal relief portion 165, and an internal interlocking portion 166. The tapered socket 164 is adjacent to the receiving end 160. The internal interlocking portion 166 is disposed between the internal relief portion 165 and the securing end 162. In an embodiment, the internal interlocking portion 166 is a plurality of internal splines 168 that are used to form a splined connection with shaft 170. In the embodiment shown, the plurality of internal splines 168 are longitudinally extending grooves that are parallel to one another and extend around the circumference of the hollow portion 158 in a standard spline pattern. In some embodiments, the hollow portion 158 includes an angled portion 169 at the securing end 162.

The shaft 170 is configured to be connected to the accessory (e.g., the nacelle sail 124) at a first end 172. The first end 172 is outboard of and opposite to the second end 174 of shaft 170. The first end 172 includes an accessory flange 176. Conventional fasteners secured in a plurality of holes 178a, 178b, 178c, 178d and/or adhesive connect the accessory flange 176 to the accessory (e.g., sail 124).

The shaft 170 includes a tapered boss 178, an external interlocking portion 180, a cylindrical portion 182, and a threaded surface 184. The tapered boss 178 is adjacent to the first end 172 and a narrow transition region 173. The tapered boss 178 is configured to engage the tapered socket 164 when in an engaged position 142 as shown in FIG. 4. The tapered boss 178 engaged with the tapered socket 164 provides a 360 degrees surface contact that will react to and withstand bending in any direction, which can advantageously provide an interface that reduces fatigue problems over conventional designs.

The external interlocking portion 180 is adjacent to the tapered boss 178 and an exterior relief portion 175. The external interlocking portion 180 is configured to engage the internal interlocking portion 166 when in an engaged position 142. The cylindrical portion 182 is disposed between the external interlocking portion 180 and the threaded surface 184. The threaded surface 184 is disposed on the second end 174 of the shaft 170. In an embodiment, the external interlocking portion 166 is a plurality of external splines 181 that are used to form a splined connection with plurality of internal splines 168. In the embodiment shown, the plurality of external splines 181 are longitudinally extending narrow keys that are parallel to one another and extend around the circumference of the shaft 170 in a standard spline pattern. The cylindrical portion 182 can be a smooth surface (e.g., a featureless cylindrical tube) of varying lengths that can depend on, for example, but not limitation, the size and weight of the accessory, torsional loads or other forces, and the attachment object (e.g., the rotorcraft frame). The second end 174 includes a threaded surface 184. The outer diameter of the cylindrical portion 182 and second end 174 are less than the outer diameter of the external interlocking portion 180 and tapered boss 178.

In other embodiments, the plurality of internal splines 168 and the plurality of external splines 181 may be other interlocking features such as teeth, key spline, involute spline, crowned spline, serrated spline, helical spline, ball spline, any other type of spline, symmetric protrusions, and/or asymmetric protrusions. In an embodiment, a master tooth can be utilized for aligning the shaft 170 with the base 150 to assist installation.

In some embodiments, the internal and external interlocking portions 166, 180 can comprise a keyway type connection with a corresponding protrusion, respectively. In an embodiment, the internal interlocking portion 166 includes only one spline or groove that corresponds to only one spline or groove in the external interlocking portion 180.

In an exemplary embodiment, the base 150 and shaft 170 are each a one-piece, unitary article made of a metallic material, for example, but not limitation, titanium, stainless steel, or other suitable material. In other embodiments, the base 150 and shaft 170 are made from a composite material. The components (e.g., base 150, shaft 170, washer 186, nut 190, and/or fastener member 194) of the mounting assembly 140 are sized (e.g., dimensions and weight) for the load of the accessory.

The base 150 and shaft 170 are releasably coupled by a washer 186, a nut 190, and/or a fastener member 194. A washer 186 can be disposed between the nut 190 and the securing end 162 of the base 150. The nut 190 is configured to be threaded onto the threaded surface 184 of the shaft 170, which compresses washer 186. The nut 190 is a conventional plain nut. In other embodiments, nut 190 can be a wing nut, lock wire nut, and/or a quick release fastener sufficient for securing the shaft 170 in the base 150 during operation.

When the shaft 170 has been slidably received in the hollow portion 158 of the base 150, the nut is tightened, which secures and pulls shaft 170 into the engaged position 142 as shown in FIG. 4. In some embodiments, as shown in FIGS. 3-4, washer 186 is a conically shaped washer that can be, for example, but not limitation, a split cone washer. A split cone washer as shown in FIG. 4 is configured to contact the angled portion 169 of the base 150 to provide another point of full contact between the base 150 and shaft 170. When the nut 190 is torqued on the threaded surface 184 of the shaft 170, the nut compresses the washer 186 (e.g. split cone washer) into the angled portion 169 of the base 150 to provide 360 degrees of surface contact that can react bending in any direction. In addition, as the nut 190 is being torqued onto the shaft 150, the split in the cone allows the washer 186 to compress and clamp onto the cylindrical portion 182 of the shaft 150.

Fastener member 194 provides a second releasable connection between the base 150 and shaft 170. In an embodiment, the fastener member 194 is a quick-release lock pin. Each of the base 150 and shaft 170 include a fastener member aperture 150a, 170a to receive the fastener member 194 therein. When the fastener member apertures 150a are aligned, the fastener member 194 can be inserted therethrough. The fastener member 194 provides a fail-safe if the nut 190 were to loosen. The fastener member 194 prevents the shaft 150 from backing out of the base 170.

The mounting assembly 140 can include one or more clocking features 196 to aid in proper alignment of the shaft 170 with base 150 with respect to the internal and external interlocking portions 166, 180 and other components transmitting loads thereto and/or to position the accessory in a desired orientation. In the illustrated embodiment, clocking features 196 is a mark on the shaft 170 that is substantially aligned with a corresponding mark on the base 150. In an embodiment, the clocking features 196 could be used to identify a desired orientation of the nacelle sail 124 (e.g., tilting the nacelle sail 124 up, down, or in a horizontal position). In some embodiments, the clocking feature 196 is an etched notch or other sufficient marking to identify an alignment location on the shaft 170 and/or base 150. The present disclosure, however, contemplates other clocking features that depend on various factors, including, but not limited to, the type and size of accessory.

When the shaft 170 is received into the hollow portion 158 of the base 150 and releasably secured therein using the washer 186, nut 190, and fastener member 194 in the engaged position 142, the shaft 170 is static and/or lacks rotational movement (e.g., the shaft 170 is non-rotatable when in the engaged position 142) and can react to bending, torsional, and axial loads that are incurred by the nacelle sail 124 during flight. The tapered boss 178 engaged with the tapered socket 164 provides a 360 degrees surface contact that reacts to bending in any direction. The internal and external interlocking portions 166, 180 of the base and shaft 150, 170, respectively, can react to and withstand the torsional loads of the nacelle sail 124. Moreover, the internal and external interlocking portions 166, 180 can allow a single user to install nut 190 by preventing the nacelle sail 124 from rotating during torqueing. The nut 190 assists reaction to the bending forces introduced by the nacelle sail 124 and provides a compressive preload for the mounting assembly 140. Accordingly, mounting assembly 140 can react to and/or withstand bending, torsion, and axial loads incurred by the nacelle sail 124 during operation of aircraft 100.

When disengaging the shaft 170 from base 150, the fastener member 194 is removed, the nut 190 is loosened, and the nut 190 and washer 186 are removed. Occasionally the washer 186 can become lodged next to the angled portion 169 of the base 150. An embodiment provides a step of crimping or otherwise connecting the nut 190 and the washer 186 to facilitate removal of both during the disengagement method.

Multiple accessories can each include a shaft 170 and can be interchangeable into base 150. As shown in FIG. 6, nacelle sail 124 has been removed and a camera 148 has been releasably connected to the aircraft 100 in base 150. In some embodiments, an aircraft can include multiple bases 150 connected to the airframe in various positions where removeable and/or interchangeable accessories are desirable.

The particular forms of the base 150 and shaft 170 are not limited to the forms discussed above and illustrated herein. Rather, other embodiments of the mounting assembly 140 contemplate the base 150 mounted to the accessory (e.g., the nacelle sail 124) and the shaft 170 mounted to the airframe 130 of the tiltrotor aircraft 100. In some embodiments, the shaft 170 can be disposed in a recess in the skin of the tiltrotor aircraft 100. The recess can be covered with a cap when the shaft 170 is not in use.

Figure 5:
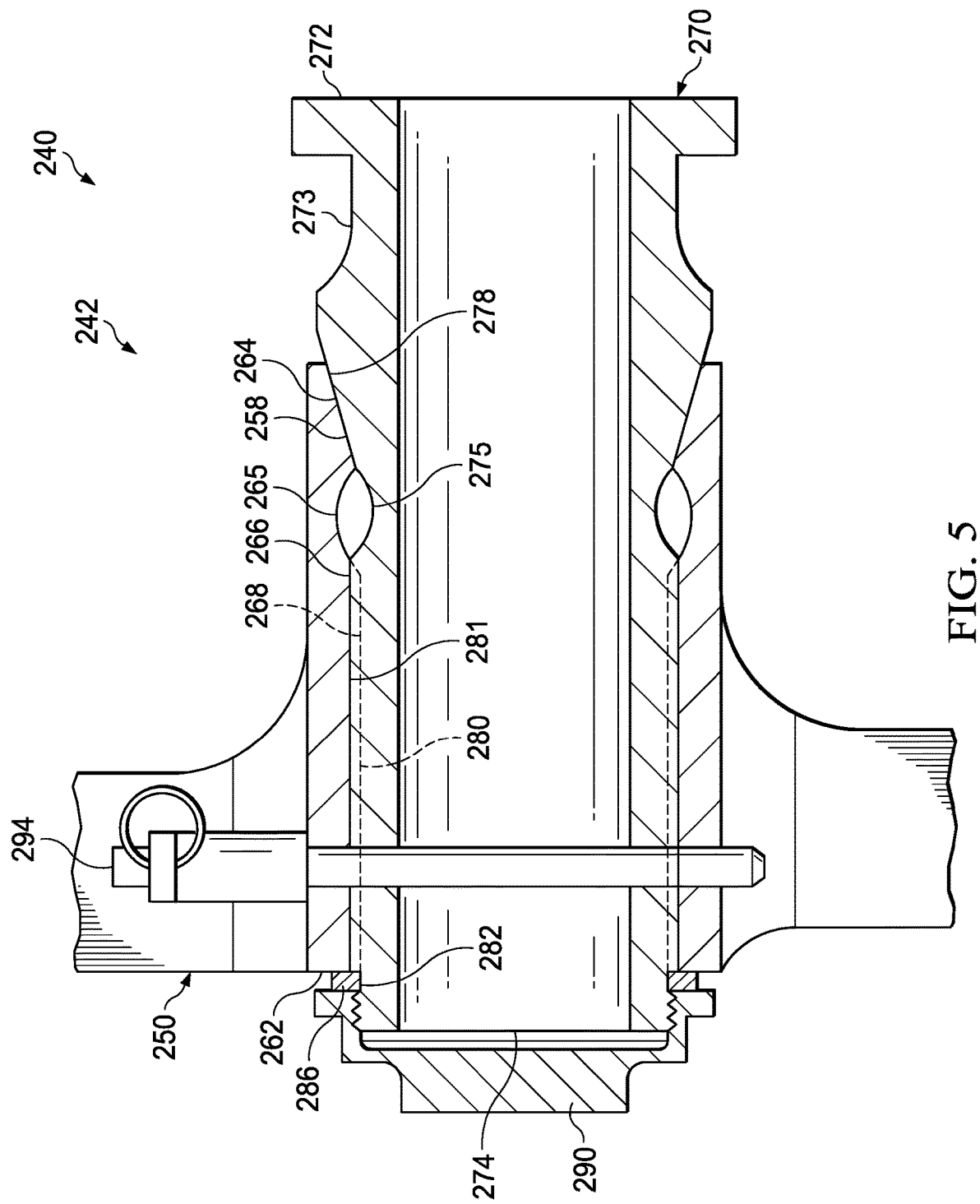
FIG. 5 is a cross-sectional view of a mounting assembly, according to an exemplary embodiment.

FIG. 5 illustrates another embodiment of a mounting assembly 240. Certain components of mounting assembly 240 are as described above in connection with the mounting assembly 140, except as noted herein. Those components bear similar reference characters to the components of the mounting assembly 140, but with a leading '2' rather than a leading '1'. The mounting assembly 240 includes a washer 286 that is a conventional washer that is fitted against the securing end 262 of the base 250 and nut 290. The securing end 262 is flat to provide a connecting surface for the washer 286. In this embodiment, there is no angled portion adjacent to the securing end 262. According to one embodiment, the length of the cylindrical portion 282 of shaft 270 is about equal to the width of the washer 286.

Figures 7A, 7B:
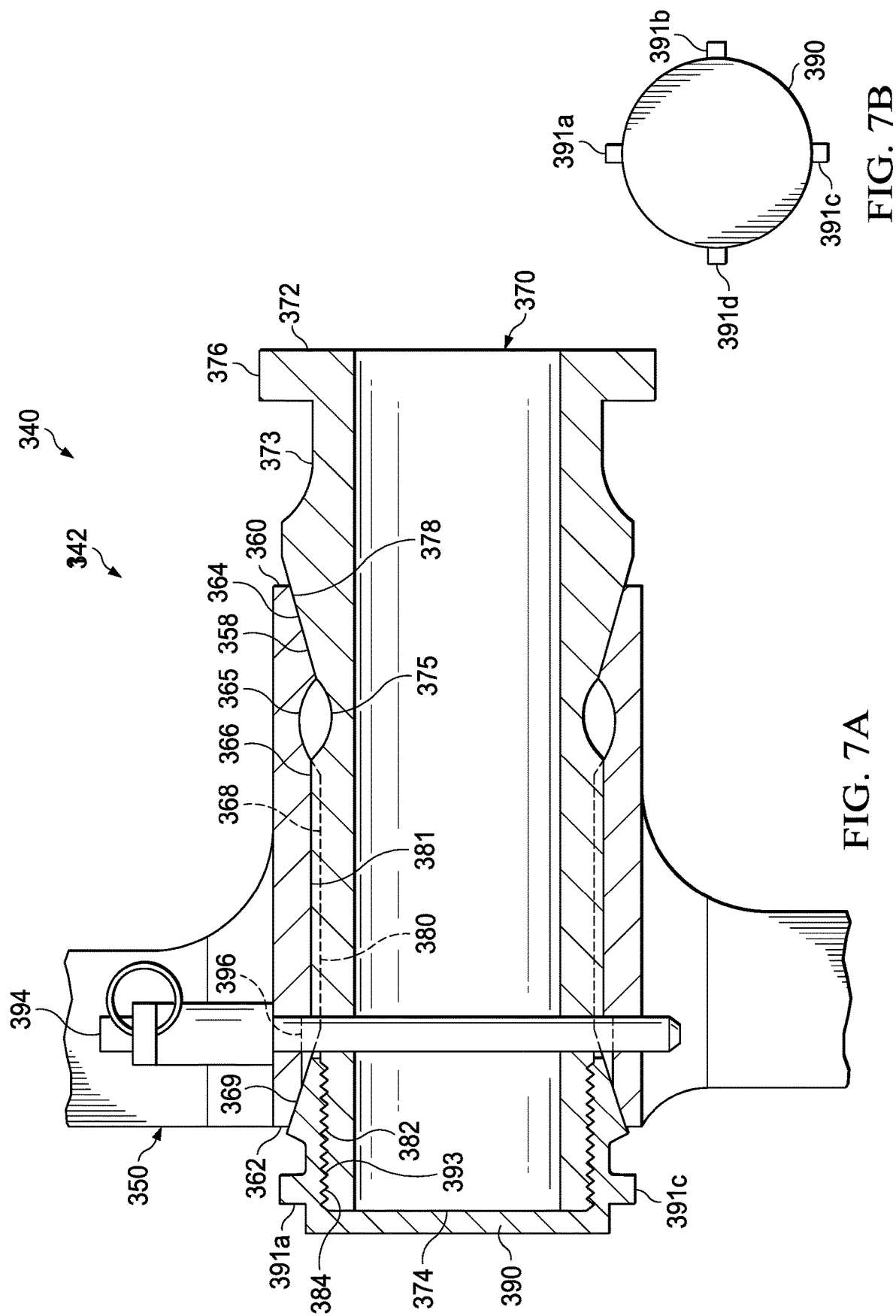
FIG. 7A is a cross-sectional view of a mounting assembly, according to one exemplary embodiment.
FIG. 7B is a top view of the nut in FIG. 7A.

FIGS. 7A-7B illustrate one embodiment of a mounting assembly 340. Certain components of mounting assembly 340 are as described above in connection with the mounting assembly 140, except as noted herein. Those components bear similar reference characters to the components of the mounting assembly 140, but with a leading '3' rather than a leading '1'. The mounting assembly 340 includes a conically shaped nut 390 that provides compressive preload against the angled portion 369 of the base 350. The conically shaped nut 390 can be torqued into the engaged position using protrusions 391a, 391b, 391c, 391d. In the embodiment shown, there are four protrusions 391a, 391b, 391c, 391d; however, there can be more or less protrusions (e.g., one, two, three, five, six, or more). The conically shaped nut 390 is in contact with the angled portion 369 of the base 350 when in the engaged position. The mounting assembly 340 does not require a washer. The conically shaped nut 390 can include an internal threaded surface 393 that mates with the threaded surface 384 on the shaft 350. Advantageously, the mounting assembly 340 with the protrusions 391a, 391b, 391c, 391d does not require the use of a ratchet for installation or removal.

The illustrative embodiments of the mounting assembly, systems, and methods described herein advantageously provide at least one of the following: allows cost and time savings during production since the mounting assembly components are simple, easy to manufacture, and easy to connect to the aircraft and accessory; simplifies and reduces cost of maintenance since the removeable and/or interchangeable accessory can be quickly attached, detached, and replaced; aircraft downtime can be minimized because damaged or worn accessories can be quickly replaced; and the mounting assembly can react to and withstand bending, torsion and axial loads that are generated during operation by an accessory externally mounted to an aircraft.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "fastener" means pins, screws, rivets, or other suitable fasteners.

Terms such as "first" and "second" are used only to differentiate features and not to limit the different features to a particular order or to a particular quantity.

At least one embodiment is disclosed and variations, combinations, and/or modifications of the embodiment(s)

and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A mounting assembly for coupling an accessory to a frame comprising:
    a base configured to be coupled to the frame; the base having a hollow portion;
    the hollow portion comprising:
        a receiving end including a tapered socket;
        an internal interlocking portion adjacent to the tapered socket;
        a securing end opposite from the receiving end; and
        an angled portion at the securing end;
    a shaft configured to be connected to an accessory at a first end, the shaft configured to be received in the hollow portion of the base in an engaged position, the shaft comprising:
        an accessory flange disposed on the first end of the shaft, the accessory flange including a plurality of holes to connect the accessory flange to an accessory;
        a tapered boss adjacent to the accessory flange, the tapered boss configured to engage the tapered socket;
        an external interlocking portion adjacent to the tapered boss configured to engage the internal interlocking portion; and
        a second end opposite from the first end, the second end including a threaded surface on a hollow cylindrical portion;
    a nut configured to be threaded onto the threaded surface of the shaft; and
    a conically shaped washer adjacent to the nut and a portion of the conically shaped washer received in the angled portion of the base;
    wherein when the nut is tightened and the shaft is secured into an engaged position in the hollow portion of the base, the conically shaped washer provides 360 degrees of surface contact with the angled portion of the base that can react to bending in any direction by the shaft.

2. The mounting assembly of claim 1, wherein the shaft further comprising a cylindrical portion disposed on the second end adjacent to the threaded surface.

3. The mounting assembly of claim 2, wherein the cylindrical portion is smooth.

4. The mounting assembly of claim 1, wherein the base and shaft are releasably coupled with a fastener member.

5. The mounting assembly of claim 4, wherein the fastener member is a quick-release lock pin.

6. The mounting assembly of claim 1, further comprising a clocking feature disposed on at least one of the base and the shaft.

* * * * *